United States Patent
Oshio et al.

(10) Patent No.: US 6,853,788 B2
(45) Date of Patent: Feb. 8, 2005

(54) RESIN COMPOSITION FOR A COATING FOR AN OPTICAL FIBER, AND COATED OPTICAL FIBER AND OPTICAL FIBER UNIT USING THE SAME

(75) Inventors: Atsushi Oshio, Kitaadachi-gun (JP); Osamu Saitou, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 107 days.

(21) Appl. No.: 10/429,027

(22) Filed: May 5, 2003

(65) Prior Publication Data

US 2003/0210879 A1 Nov. 13, 2003

(30) Foreign Application Priority Data

May 10, 2002 (JP) ..................................... P2002-135390

(51) Int. Cl.[7] .................................................. G02B 6/02
(52) U.S. Cl. ........................ 385/128; 385/127; 385/145
(58) Field of Search ................................ 385/123–128, 385/141, 145

(56) References Cited

U.S. PATENT DOCUMENTS

2004/0022511 A1 * 2/2004 Eekelen et al. ............. 385/128

FOREIGN PATENT DOCUMENTS

| EP | 0 301 733 A1 | 2/1989 |
|---|---|---|
| JP | 63-168417 | 7/1988 |
| JP | 63-275619 | 11/1988 |
| JP | 5-163318 | 6/1993 |
| WO | WO 98/10004 | 3/1998 |
| WO | WO 00/01781 | 1/2000 |

* cited by examiner

Primary Examiner—Akm Enayet Ullah
Assistant Examiner—Sung Pak
(74) Attorney, Agent, or Firm—Armstrong, Kratz, Quintos, Hanson & Brooks, LLP

(57) ABSTRACT

A resin composition for a coating for an optical fiber which comprises a radical polymerizable oligomer (A) and a radical polymerizable monomer (B), wherein (A) comprises a radical polymerizable oligomer (A1) with Mn of 600 to 1600 formed by reacting compounds (1) to (3) below: (1) an aliphatic polyol compound with Mn of 50 to 600, (2) a polyisocyanate compound with a ring structure, and (3) a compound with a hydroxyl group and a radical polymerizable unsaturated group; and a radical polymerizable oligomer (A2) formed by reacting compounds (4) to (6) below: (4) an aliphatic polyol compound with Mn of 800 to 10,000, (5) a polyisocyanate compound, and (6) a compound with a hydroxyl group and a radical polymerizable unsaturated group; a mass ratio (A1)/(A2) is 20/80 to 80/20, and a concentration of urethane linkages within the resin composition is 1.85 to 3.00 mol/kg.

5 Claims, No Drawings

US 6,853,788 B2

RESIN COMPOSITION FOR A COATING FOR AN OPTICAL FIBER, AND COATED OPTICAL FIBER AND OPTICAL FIBER UNIT USING THE SAME

BACKGROUND OF THE INVENTION

1. Field of the Invention

The present invention relates to a resin composition for a coating for an optical fiber, and to a coated optical fiber and an optical unit using such a resin composition. More specifically, the present invention relates to a resin composition for a coating for an optical fiber used for a secondary coating layer or a unit layer.

2. Description of the Related Art

Optical fiber cables are used as a transmission medium for large volumes of information, and broad band information communication networks using optical fiber cables continue to be constructed. Optical fibers include double layer coating structures in which a primary coating and a secondary coating formed from an ultraviolet light or radiation curing resin are provided on a glass waveguide, and single layer coating structures with a single coating layer.

The primary coating layer of a double layer coating structure is typically a flexible coating with a Young's modulus (tensile modulus) of 0.01 to 1.0 kg/mm$^2$, whereas the secondary coating layer is typically a comparatively hard coating with a Young's modulus of 20 to 200 kg/mm$^2$.

Furthermore, there are various configurations available for the use of optical fibers, including so-called unit configurations in which either a plurality of optical fibers comprising a coated glass waveguide, or a plurality of colored optical fibers provided with a colored layer as the outermost layer, are arranged either concentrically or within a flat plane, and are then integrated together via a radiation cured resin. A unit structure is a structure in which a plurality of optical fibers covered with either a single coating or a double coating are bundled together and wrapped with a curable coating (unit layer) of a radiation curable resin composition. Units comprising a plurality of integrated units are also possible. These unit configurations are an effective method of increasing the density of the optical fibers, and are widely used as structural components within optical fiber cables. The curable resin used in the primary coating layer, the secondary coating layer and the unit layer is known as a resin composition for a coating for an optical fiber.

A resin composition for a coating for an optical fiber for use as a secondary coating layer or a unit layer needs to display the following properties.

1. Rapid Processability

A low viscosity, and an ability to coat and cure the composition rapidly.

2. Rapid Curability

Satisfactory curing even with high speed processing (low dose) of several hundred m/minute, and an ability to obtain a cured product with the necessary Young's modulus.

3. Durability

The mechanical characteristics of a cured coating of the resin composition do not vary even when exposed to a variety of different environments (hot water, high humidity, high temperature, waterproofing mixture) over extended periods, and the durability of the optical fiber is good.

4. Temperature Characteristics

An optical fiber covered with a cured coating of the resin composition shows no variation in transmission characteristics or mechanical characteristics, even when used across a wide range of temperature conditions.

5. Toughness

A cured coating of the resin composition displays a good balance between Young's modulus and the breaking elongation.

6. Water Resistant Loss Characteristics

Even in cases in which the cable sheath is damaged by an accident following construction of the cable, and water enters the cable, the water causes no deterioration in the optical transmission characteristics of the optical fiber covered with a cured coating of the resin composition, even over long periods.

7. Storage

Even if the resin composition is stored at low temperature, no crystallizing occurs, meaning the life of the resin composition is very good.

Many different investigations have been conducted aimed at improving the above characteristics. For example, in Japanese Unexamined Patent Application, First Publication No. Sho 63-275619, combinations of a high molecular weight urethane acrylate with a number average molecular weight of 1000 to 15,000, and a low molecular weight urethane acrylate with a number average molecular weight of no more than 800 are disclosed as a method of improving the breaking elongation. Furthermore, in Japanese Unexamined Patent Application, First Publication No. Sho 63-168417, resin compositions for a coating for an optical fiber comprising an aliphatic radical polymerizable polymer with a polyether structure within the molecule, and a radical polymerizable polymer with a bisphenol A or bisphenol F type structure and a polyether structure within the molecule are disclosed as a method of improving the toughness and high speed curability of the composition. In addition, Japanese Unexamined Patent Application, First Publication No. Hei 5-163318 discloses optical fiber resin compositions comprising a urethane acrylate with ring structures within the molecule, in which the urethane linkage concentration within the composition is at least 2.0×10$^{-3}$, and the coating produced on curing has a high Young's modulus (1500 MPa).

However recently, in addition to the characteristics described above, a further important characteristic has been identified as necessary. This new characteristic requires that for an optical fiber coated with a cured resin composition, in the case in which, for some reason or other, a scratch (or notch) forms in the surface of the coating layer formed from the resin composition, the cured composition displays sufficient tear resistance that the notch does not widen causing a major deterioration in the optical fiber characteristics during handling or extended installation (hereafter, in the present invention this characteristic is termed "notch resistance"), and also requires that when a unit needs to be deconstructed and the internal units or optical fibers removed, the unit layer can be peeled reliably at the desired position, producing a long and stable peeling in the longitudinal direction without splitting occurring partway along the peeling (hereafter, in the present invention this characteristic is termed "deconstructability"). In order to satisfy both of these requirements of notch resistance and deconstructability, it is important that the cured resin composition covering the optical fiber has an adequate tear strength, while also displaying a suitable Young's modulus and a suitable breaking elongation. However, in the case of the resin compositions for a coating for an optical fiber disclosed in the existing literature described above, no consideration was given to notch resistance to account for the possibility of a notch appearing due to heavy handling, nor to deconstructability, and consequently the resin compositions are not able to adequately satisfy these characteristics. Typically, the type of notch resistance described above is tested using the method disclosed in JIS K 6252-1993.

SUMMARY OF THE INVENTION

An object of the present invention is to provide a resin composition for a coating for an optical fiber which has a satisfactory level of toughness, and in particular displays excellent notch resistance in cases in which a notch appears. Furthermore, another object of the present invention is to provide optical fiber wiring and units using a resin composition for a coating for an optical fiber, which achieves the above object, and also offers excellent deconstructability of the optical fiber and units.

Taking the above circumstances into consideration, and as a result of intensive investigations aimed at resolving the above problems, the inventors of the present invention discovered that by using a radical polymerizable oligomer with a specific structure, and setting the concentration of urethane linkages within a resin composition for covering an optical fiber to a specific value, a resin composition for a coating for an optical fiber which was capable of resolving the problems described above could be achieved, and were hence able to complete the present invention.

In other words, the present invention provides a resin composition for a coating for an optical fiber comprising a radical polymerizable oligomer (A) and a radical polymerizable monomer (B), wherein the radical polymerizable oligomer (A) comprises a radical polymerizable oligomer (A1) with a number average molecular weight of 600 to 1600 formed by reacting compounds (1) to (3) below:
(1) an aliphatic polyol compound (a1) with a chain structure which may contain branch chains, with a number average molecular weight of 50 to 600,
(2) a polyisocyanate compound (a2) with a ring structure, and
(3) a compound (a3) with a hydroxyl group and a radical polymerizable unsaturated group within the same molecule,
and a radical polymerizable oligomer (A2) formed by reacting compounds (4) to (6) below:
(4) an aliphatic polyol compound (a4) with a chain structure which may contain branch chains, with a number average molecular weight of 800 to 10,000,
(5) a polyisocyanate compound (a5), and
(6) a compound (a3) with a hydroxyl group and a radical polymerizable unsaturated group within the same molecule;
the mass ratio (A1)/(A2) of the radical polymerizable oligomer (A1) and the radical polymerizable oligomer (A2) is within a range from 20/80 to 80/20, and the concentration of urethane linkages within the resin composition for a coating for an optical fiber is within a range from 1.85 to 3.00 mol/kg.

Furthermore, the present invention also provides optical fibers and units coated with the resin composition for a coating for an optical fiber described above.

The inventors of the present invention discovered that by combining a high molecular weight urethane acrylate and a low molecular weight urethane acrylate, a suitable Young's modulus and breaking elongation could be achieved, and as a result a resin composition for a coating for an optical fiber with superior toughness could be produced. However, this was not sufficient to realize a satisfactory level of notch resistance and deconstructability. Accordingly, the inventors of the present invention conducted research aimed at improving the notch resistance and the deconstructability, while maintaining a suitable level of toughness. As a result, they discovered that by setting the number average molecular weight of the polyol compounds used in producing the high molecular weight urethane acrylate and the low molecular weight urethane acrylate to values within a specified range, and adjusting the concentration of urethane linkages within the resin composition for a coating for an optical fiber to a value within a range from 1.85 to 3.00 mol/kg, the above objects could be achieved, and were hence able to complete the present invention.

In this specification, toughness and notch resistance of a curable resin composition means toughness and notch resistance of a cured material obtained by curing the curable resin composition.

DETAILED DESCRIPTION OF THE PREFERRED EMBODIMENTS

As follows is a more detailed description of the present invention.

A polyol compound (a1) used for producing a radical polymerizable oligomer (A1) which forms one component of a resin composition for a coating for an optical fiber according to the present invention may utilize any known polyol compound with a chain structure which may contain branch chains, with a number average molecular weight within a range from 50 to 600. Suitable examples include (1) aliphatic polyols obtained from at least one of ethylene glycol, 1,4-butylene glycol, neopentyl glycol, 1,6-hexanediol, 2-ethyl-1,6-hexanediol, decanediol, undecanediol, 3-methylpentanediol, trimethylolpropane and pentaerythritol; (2) polyester polyols obtained by ring peeling polymerization of a lactone such as ε-caprolactone and γ-valerolactone; and (3) polyether polyols which are either polymers of cyclic ethers, including alkylene oxides such as ethylene oxide, propylene oxide and 1,2-butylene oxide, as well as tetrahydrofuran and alkyl substituted tetrahydrofurans, or alternatively are copolymers of two or more such cyclic ethers.

The aforementioned polyol compound (a1) has a chain type molecular structure with no ring structures within the molecule. A resin composition for a coating for an optical fiber using this type of compound is desirable as on curing it produces a coating which has good notch resistance, with a Young's modulus which is not overly high, and an elongation which is not too low. Provided the molecular structure has no ring structures within the molecule, then either straight chain or branched chain structures are suitable.

Furthermore, the number average molecular weight of the polyol compound (a1) is preferably within a range from 150 to 500, and even more preferably from 150 to 400. If the number average molecular weight falls within this range, then the notch resistance increases favorably. Examples of preferred polyol compounds (a1) include simple ring opening addition polymers from a single monomer such as propylene oxide, 1,2-butylene oxide or 3-methyltetrahydrofuran, or alternatively, ring opening addition copolymers of these ring compounds. Of these polyol compounds, a simple ring opening addition homopolymer of propylene oxide, namely polypropylene glycol, is particularly preferred. If a polyether diol with side chains is used, then the resin composition for a coating for an optical fiber will not harden at low temperatures, and will also display favorable notch resistance.

The aforementioned polyisocyanate compound (a2) with a ring structure may utilize known compounds, and suitable examples include polyisocyanates such as 2,4- tolylenediisocyanate, 2,6-tolylenediisocyanate, 4,4'-diphenylmethane diisocyanate, hydrogenated 4,4'-diphenylmethane diisocyanate, xylylene diisocyanate, hydrogenated xylylene diisocyanate, isophorone diisocyanate, 1,5-naphthalene diisocyanate, tolidine diisocyanate, p-phenylene diisocyanate, tetramethylxylene diisocyanate, bicycloheptane triisocyanate, dicyclopentadiene diisocyanate and norbornene diisocyanate. Of these, using a diisocyanate with a molecular weight of 150 to 300 results in a coating layer with an even better notch resistance, and is consequently preferred.

The aforementioned compound (a3) with a hydroxyl group and a radical polymerizable unsaturated group within the same molecule may utilize known compounds, and suitable examples include 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethylphthalic acid, pentaerythritol tri(meth)acrylate, 3-acryloyloxyglycerine mono(meth)acrylate, 2-hydroxybutyl (meth)acrylate, 2-hydroxy-1-(meth) acryloxy-3-(meth)acryloxypropane, glycerine di(meth) acrylate, polypropylene glycol mono(meth)acrylate, polyethylene glycol mono(meth)acrylate, polyε-caprolactone mono(meth)acrylate, 4-hydroxybutyl (meth)acrylate, and ε-caprolactone mono(meth)acrylate. Of these, using a compound with a single hydroxyl group and a single radical polymerizable unsaturated group within each molecule results in a coating layer with an even better notch resistance, and is consequently preferred.

The number average molecular weight of the radical polymerizable oligomer (A1) used in the present invention is within a range from 600 to 1600, and preferably from 700 to 1400, and even more preferably from 800 to 1100. Number average molecular weights within this range yield coating layers with even better notch resistance, and are consequently preferred.

The radical polymerizable oligomer (A1) used in the present invention can be produced with a variety of different structures depending on the selection of the raw materials described above. For example, by using a polyol compound (a1) or a polyisocyanate compound (a2) with at least 3 functional groups, an oligomer with a branched structure can be produced. However, in the case of the radical polymerizable oligomer (A1), oligomers with a straight primary chain, produced using a bifunctional polyol compound (a1) and a bifunctional polyisocyanate compound (a2), are preferred. Furthermore, in the case of the compound (a3) with a hydroxyl group and a radical polymerizable unsaturated group within the same molecule, compounds with a single hydroxyl group and a single radical polymerizable unsaturated group within each molecule are preferred. When such materials are used, the radical polymerizable oligomer (A1) will be formed with a structure represented by a formula 1 shown below.

$$R_1\text{-}A(\text{-}R_2\text{-}A\text{-}R_3\text{-}A)_n\text{-}R_2\text{-}A\text{-}R_1 \quad \text{Formula 1}$$

(wherein, A represents a urethane linkage, $R_1$ is a group derived from the compound (a3) with a single hydroxyl group and a single radical polymerizable unsaturated group within the same molecule, $R_2$ is a group derived from the bifunctional polyisocyanate compound (a2), $R_3$ is a group derived from the bifunctional polyol compound (a1), and n is an integer of 1 or greater)

Of the compounds represented by the formula 1, oligomers in which the combined total of compounds with n=1 and n=2 accounts for at least 30 mass %, and preferably at least 50 mass %, and even more preferably at least 70 mass % of the total quantity of the radical polymerizable oligomer (A1) produce optical fiber coating layers with even better notch resistance, and are consequently preferred.

In a resin composition for a coating for an optical fiber of the present invention, in addition to the radical polymerizable oligomer (A1), the radical polymerizable oligomer (A) also uses a radical polymerizable oligomer (A2). The radical polymerizable oligomer (A2) is formed by reacting compounds (4) to (6) shown below:

(4) an aliphatic polyol compound (a4) with a chain structure which may contain branch chains, with a number average molecular weight of 800 to 10,000, (5) a polyisocyanate compound (a5), and (6) a compound (a3) with a hydroxyl group and a radical polymerizable unsaturated group within the same molecule. Of these oligomers, urethane acrylates formed by reacting a diol compound with a number average molecular weight of 800 to 10,000, a diisocyanate compound, and a compound with a single hydroxyl group and a single radical polymerizable unsaturated group within the same molecule are preferred.

Examples of the aliphatic polyol compound (a4) with a chain structure which may contain branch chains and with a number average molecular weight of 800 to 10,000 include polyester polyols obtained by ring opening polymerization of a lactone such as ε-caprolactone or γ-valerolactone, and polyether polyols which are either polymers of cyclic ethers, including alkylene oxides such as ethylene oxide, propylene oxide and 1,2-butylene oxide, as well as tetrahydrofuran and alkyl substituted tetrahydrofurans, or alternatively are copolymers of two or more such cyclic ethers. The polyol compound (a4) has a chain type molecular structure with no ring structures within the molecule. Provided the molecular structure has no ring structures within the molecule, then either straight chain or branched chain structures are suitable. Of the above polyol compounds, simple ring opening addition homopolymers or ring opening addition copolymers of branched cyclic ethers such as propylene oxide, 1,2-butylene oxide or 3-methyltetrahydrofuran offer good low temperature storage and rapid curing, and are consequently preferred. Of these, a simple ring opening addition homopolymer of propylene oxide, namely polypropylene glycol, is particularly preferred.

Accordingly, in a preferred embodiment of a resin composition for a coating for an optical fiber according to the present invention, the polyol compound (a1) and the polyol compound (a4) are compounds with a polyether structure, and the polyol compound (a1) and the polyol compound (a4) are even more preferably ring opening addition polymers of one or more compounds selected from propylene oxide, 1,2-butylene oxide and 3-methyltetrahydrofuran.

Furthermore, there are no particular restrictions on the polyisocyanate compound (a5), and in addition to the compounds described above in relation to the polyisocyanate compound (a2), other known compounds can also be used. Examples of these alternative compounds include compounds with no ring structures such as hexamethylene diisocyanate, 1,6,11-undecane triisocyanate, 1,8-diisocyanate-4-isocyanatemethyloctane, 1,3,6-hexamethylene triisocyanate, 2,2,4-trimethylhexamethylene diisocyanate, and 2,4,4-trimethylhexamethylene diisocyanate.

The number average molecular weight of the radical polymerizable oligomer (A2) should be within a range from 1200 to 20,000, and preferably from 1400 to 15,000, and even more preferably from 1400 to 10,000.

The mass ratio (A1)/(A2) of the radical polymerizable oligomer (A1) and the radical polymerizable oligomer (A2) for a resin composition for a coating for an optical fiber of the present invention is within a range from 20/80 to 80/20, and preferably from 30/70 to 70/30, and even more preferably from 40/60 to 70/30. Ratios within this range produce superior notch resistance and are consequently preferred.

In the present invention, in addition to the radical polymerizable oligomers (A1) and (A2), other known oligomers may also be used. Suitable examples of these other oligomers include urethane acrylates produced by the reaction of a polyisocyanate compound (a2) and a compound (a3) with a hydroxyl group and a radical polymerizable unsaturated group within the same molecule, epoxy acrylates produced by the reaction of a glycidyl ether compound and a carboxylic acid with a polymerizable unsaturated group such as (meth)acrylic acid, as well as urethane acrylates formed by a reaction including epoxyacrylates as a polyol and oligomers arising from the reaction of vinyl ether compounds.

In a resin composition for a coating for an optical fiber according to the present invention, the concentration of urethane linkages within the resin composition for a coating for an optical fiber must fall within a range from 1.85 to 3.00 mol/kg, and preferably from 1.85 to 2.50 mol/kg, and even more preferably from 1.85 to 2.20 mol/kg. By ensuring a value within this range, a resin composition for a coating for an optical fiber is formed which displays superior notch resistance, with a satisfactory toughness even in cases in which a notch appears in either the optical fiber coating layer or the unit material.

In a resin composition for a coating for an optical fiber according to the present invention, a radical polymerizable monomer (B) can also be used in addition to the aforementioned radical polymerizable oligomers (A1) and (A2). The concentration of urethane linkages within the resin composition for a coating for an optical fiber is determined by calculating the concentration of urethane linkages (mol/kg) within the radical polymerizable oligomer (A) and the radical polymerizable monomer (B), and then calculating the overall concentration based on the relative proportions of each of these constituents. A more specific description of the calculation method is provided below.

The concentration of urethane linkages within a resin composition for a coating for an optical fiber is termed Z (mol/kg). Furthermore, the concentration of urethane linkages within a compound R used as either the radical polymerizable oligomer (A) or the radical polymerizable monomer (B) is termed $Z_R$ (mol/kg).

(1) Calculation of $Z_R$ $$Z_R \text{ (mol/kg)} = (R_{mol}/M_R) \times 1000$$

$R_{mol}$: the number of mols of urethane linkages within 1 mol of the compound R $M_R$: the molecular weight of the compound R $R_{mol}$ and $M_R$ are determined stoichiometrically from the molecular weights and molar ratios of the raw materials used to produce the compound R.

(2) Calculation of Z

If components R1, R2, . . . Ri are used as the compound R, then $$Z = (Z_{R1} \times W_{R1} + Z_{R2} \times W_{R2} + \ldots + Z_{Ri} \times W_{Ri})/(W_{R1} + W_{R2} + \ldots + W_{Ri} + \text{quantity of other additives})$$

$W_{R1}, W_{R2}, \ldots W_{Ri}$: the quantities of the components $R_1, R_2, \ldots R_i$ In order to ensure that the cured coating produced when a resin composition for a coating for an optical fiber of the present invention is cured displays excellent notch resistance, the Young's modulus (tensile modulus) of the cured coating must be within a range from 100 to 1450 MPa, and preferably from 400 to 1200 MPa, and even more preferably from 500 to 1000 MPa. If the Young's modulus falls within the above range, then a satisfactory notch resistance can be achieved.

The notch resistance can be tested using the method disclosed in JIS K 6252-1993. Provided the notch resistance measured by this test method is at least 4.5 (kgf/mm), a resin composition for a coating for an optical fiber can be obtained which displays excellent tear strength in those cases in which a notch appears. Notch resistance values of at least 4.8 (kgf/mm) are particularly desirable. The testing method of the present invention is described below in detail.

(1) Method of Preparing a Cured Film: A prepared resin composition for a coating for an optical fiber is applied to a glass plate, and using a metal halide lamp, is then irradiated with 0.5 J/cm$^2$ of ultraviolet light in a nitrogen atmosphere, thereby forming a cured film with a film thickness of 150 μm.

(2) Test Piece: A crescent shaped test piece as disclosed in JIS K 6252-1993. A cut (notch) of length 1.0±0.2 mm is inserted in the center of the hollow of the crescent shaped test piece in a direction at right angles to the principal axis of the test piece. The cut is made with a sharp cutter in accordance with the method disclosed in JIS K 6252-1993, in a direction parallel to the thickness direction of the test piece (perpendicularly to the upper and lower surfaces of the test piece).

(3) Measurement Apparatus: Universal tensile tester, Autograph AGS-100G, manufactured by Shimadzu Corporation (4) Cross Head Speed: 50 mm/min (5) Measurement Conditions: 23° C., 50% RH Using the measurement method described above, a notched sample was tested, and the tear strength at the point the sample ruptured was recorded as the notch resistance.

The radical polymerizable monomer (B) used in the present invention can utilize known materials. Suitable examples include monofunctional polymerizable monomers such as methoxyethylene glycol (meth)acrylate, methoxypolyethylene glycol (meth)acrylate, β-(meth)acryloyloxyethyl hydrogen phthalate, β-(meth)acryloyloxyethyl hydrogen succinate, nonylphenoxyethyl (meth)acrylate, nonylphenoxypolyoxyethylene (meth)acrylate, nonylphenoxypolyoxypropylene (meth)acrylate, 3-chloro-2-hydroxypropyl (meth)acrylate, phenoxyethyl (meth)acrylate, phenoxypolyethylene glycol (meth)acrylate, methoxypolyethylene glycol (meth)acrylate, β-(meth)acryloyloxypropyl hydrogen phthalate, β-(meth)acryloyloxypropyl hydrogen succinate, butoxypolyethylene glycol (meth)acrylate, alkyl (meth)acrylate, cyclohexyl (meth)acrylate, tetrahydrofurfuryl (meth)acrylate, isobornyl (meth)acrylate, benzyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethylphthalic acid, 3-acryloyloxyglcerine mono(meth)acrylate, 2-hydroxybutyl (meth)acrylate, 2-hydroxy-1-(meth)acryloxy-3-(meth)acryloxypropane, polypropylene glycol mono(meth)acrylate, polyethylene glycol mono(meth)acrylate, polyε-caprolactone mono(meth)acrylate, dialkylaminoethyl (meth)acrylate, glycidyl (meth)acrylate, mono[2-(meth)acryloyloxyethyl]acid phosphate, trifluoroethyl (meth)acrylate, 2,2,3,3-tetrafluoropropyl (meth)acrylate, 2,2,3,4,4,4-hexafluorobutyl (meth)acrylate, perfluorooctylethyl (meth)acrylate, dicyclopentenyloxyalkyl (meth)acrylate, dicyclopentenyl (meth)acrylate, tricyclodecanyl (meth) acrylate, tricyclodecanyloxyethyl (meth)acrylate, isobornyloxyethyl (meth)acrylate, N-vinylpyrrolidone, 2-vinylpyridine, morpholine (meth)acrylate and N-vinylcaprolactam.

Furthermore, examples of suitable bifunctional polymerizable monomers include 2,2-dimethyl-3-hydroxypropyl-2, 2-dimethyl-3-hydroxypropionate di(meth)acrylate, ethylene glycol di(meth)acrylate, polyethylene glycol di(meth) acrylate, propylene glycol di(meth)acrylate, polypropylene glycol di(meth)acrylate, 1,4-butanediol di(meth)acrylate, 1,6-hexanediol di(meth)acrylate, glycerine di(meth)acrylate, neopentyl glycol di(meth)acrylate, hydroxypivalic acid neopentyl glycol di(meth)acrylate, di(meth)acrylates of ethylene oxide addition products of bisphenol A, di(meth) acrylates of propylene oxide addition products of bisphenol A, 2,2'-di(hydroxypropoxyphenyl)propane di(meth) acrylate, 2,2'-di(hydroxyethoxyphenyl)propane di(meth) acrylate, tricyclodecanedimethylol di(meth)acrylate, di(meth)acrylates of ethylene oxide addition products of bisphenol F, di(meth)acrylates of propylene oxide addition products of bisphenol F, 3,9-bis(1,1-dimethyl-2-hydroxyethyl)-2,4,8,10-tetraoxaspiro[5,5]undecane diacrylate, and 5-ethyl-2-(2-hydroxy-1,1-dimethylethyl)-5-(hydroxymethyl)-1,3-dioxane diacrylate.

Furthermore, examples of suitable polyfunctional polymerizable monomers include trimethylolpropane tri(meth) acrylate, pentaerythritol tri(meth)acrylate, pentaerythritol tetra(meth)acrylate, dipentaerythritol hexa(meth)acrylate, tetramethylolmethane tri(meth)acrylate, tetramethylolmethane tetra(meth)acrylate, tris(2-hydroxyethyl) isocyanurate tri(meth)acrylate, tris(hydroxypropyl) isocyanurate tri(meth)acrylate, trimellitic acid tri(meth) acrylate, triallyltrimellitic acid and triallylisocyanurate.

Of the above monomers, polyfunctional polymerizable monomers with more than 2 functional groups such as trimethylolpropane tri(meth)acrylate, pentaerythritol tri (meth)acrylate, pentaerythritol tetra(meth)acrylate, dipentaerythritol hexa(meth)acrylate, tetramethylolmethane tri (meth)acrylate, tetramethylolmethane tetra(meth)acrylate, tri(meth)acrylates of ethylene oxide or propylene oxide addition products of trimethylolpropane, tri(meth)acrylates of ethylene oxide or propylene oxide addition products of pentaerythritol, tetra(meth)acrylates of ethylene oxide or propylene oxide addition products of pentaerythritol, hexa (meth)acrylates of ethylene oxide or propylene oxide addition products of dipentaerythritol, tri(meth)acrylates of ethylene oxide or propylene oxide addition products of tetramethylolmethane, and tetra(meth)acrylates of ethylene oxide or propylene oxide addition products of tetramethylolmethane are preferred as they increase the toughness. In addition, monofunctional polymerizable monomers containing a nitrogen atom such as N-vinylpyrrolidone, 2-vinylpyridine, morpholine (meth)acrylate, N-vinylcaprolactam and N-vinylcarbazole are also preferred as they increase the notch resistance. By combining a monofunctional polymerizable monomer containing nitrogen with a polyfunctional polymerizable monomer with more than 2 functional groups, the notch resistance can be increased even further, which is even more desirable.

When a resin composition for a coating for an optical fiber of the present invention is cured with either visible light or ultraviolet light, a photopolymerization initiator (C) may be used if required. Examples of suitable photopolymerization initiators (C) include 4-dimethylaminobenzoic acid, 4-dimethylaminobenzoate esters, alkoxyacetophenones, benzyldimethylketal, benzophenone and benzophenone derivatives, alkyl benzoylbenzoates, bis(4-dialkylaminophenyl)ketones, benzil and benzil derivatives, benzoin and benzoin derivatives, benzoin alkyl ethers, 2-hydroxy-2-methylpropiophenone, 1-hydroxycyclohexyl phenyl ketone, thioxanthone and thioxanthone derivatives, 2,4,6-trimethylbenzoyldiphenylphosphine oxide, 2-methyl-1-[4-(methylthio)phenyl]-2-morpholinopropane-1, 2-benzyl-2-dimethylamino-1-(4-morpholinophenyl)-butanone-1, bis(2,6-dimethoxybenzoyl)-2,4,4-trimethylpentylphosphine oxide, 3,6-bis(2-methyl-2-morpholinopropionyl)-9-n-octylcarbazole and 2,2-dimethoxy-2-phenylacetophenone.

Of these, if at least two materials are mixed together from a group consisting of 1-hydroxycyclohexyl phenyl ketone, thioxanthone and thioxanthone derivatives, 2,4,6-trimethylbenzoyldiphenylphosphine oxide, 2-methyl-1-[4-(methylthio)phenyl]-2-morpholinopropane-1,2-benzyl-2-dimethylamino-1-(4-morpholinophenyl)-butanone-1, bis(2, 6-dimethoxybenzoyl)-2,4,4-trimethylpentylphosphine oxide, 3,6-bis(2-methyl-2-morpholinopropionyl)-9-n-octylcarbazole and 2,2-dimethoxy-2-phenylacetophenone, then the high speed curability of the composition improves favorably. Of the above initiators, systems containing 3,6-bis(2-methyl-2-morpholinopropionyl)-9-n-octylcarbazole offer a markedly superior rapid curability and are consequently preferred.

Furthermore, in a resin composition for a coating for an optical fiber according to the present invention, in addition to the constituents described above, other additives may also be added, including polymerization inhibitors such as hydroquinone and hydroquinone monomethyl ether, antioxidants such as hindered phenol compounds and sulfur compounds, photostabilizers such as hindered amine compounds, decoloring agents such as phosphite ester compounds, antifoaming agents such as silicone oil, releasing agents, leveling agents and pigments.

The radical polymerizable oligomer (A) described above comprises from 40 mass % to 90 mass %, and preferably from 50 to 80 mass %, and even more preferably from 50 to 70 mass % of the entire resin composition for a coating for an optical fiber of the present invention. Furthermore, the radical polymerizable monomer (B) preferably comprises from 10 mass % to 60 mass %, and even more preferably from 30 to 50 mass % of the entire resin composition for a coating for an optical fiber.

Furthermore, polyfunctional polymerizable monomers with more than two functional groups preferably comprise from 0 to 40 mass %, and even more preferably from 10 to 30 mass % of the entire resin composition for a coating for an optical fiber.

The aforementioned photopolymerization initiator (C) is added to enable the resin composition for a coating for an optical fiber of the present invention to undergo curing in the presence of ultraviolet light, and the quantity of the photopolymerization initiator (C) is typically within a range from 0.01 to 10 mass %, and preferably from 0.05 to 5 mass % based on the combined quantity of 100 mass % of the radical polymerizable oligomer (A), the radical polymerizable monomer (B), and the photopolymerization initiator (C).

In a resin composition for a coating for an optical fiber according to the present invention, in order to improve the processability and the transmission characteristics of the optical fiber, it is preferable that the physical properties of the composition and the cured coating thereof are adjusted so as to fall within the ranges described below.

Composition Viscosity: Preferably within a range from 1.0 to 10.0 Pa·s (25° C., B type viscometer). At values less than 1.0 Pa·s or greater than 10.0 Pa·s, the high speed curability is poor, and variations in external diameter and rupturing of the cured coating can occur during high speed production of the optical fiber.

Amongst other characteristics of the cured coating, values which fall within the ranges described below produce better transmission characteristics, and better handling of the wiring or units, and are consequently preferred.

Glass Transition Temperature: 50 to 150° C., and preferably from 80 to 120° C.

Tensile Breaking Strength: At least 30 MPa, and preferably at least 40 MPa.

Breaking Elongation: At least 30%, and preferably at least 40%, and even more preferably at least 50%. If the breaking elongation is less than 30%, then the deconstructability is undesirably poor.

EXAMPLES

As follows is a description of specifics of the present invention based on a series of examples, although the invention is in no way restricted to the examples presented. In the examples, all references to "parts" refer to parts by mass.

1. Synthesis of Radical Polymerizable Oligomers (A2)

Synthetic Example 1

Synthesis of a Urethane Acrylate (A2-1)

348 g (2 mol) of TDI (2,4-tolylenediisocyanate) was placed in a flask equipped with a stirring blade, and with constant stirring, 2000 g (1 mol) of polypropylene glycol (number average molecular weight 2000) and 2 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, and when the NCO % was then measured, the result was 3.58%. Subsequently, 232 g (2 mol) of HEA (2-hydroxyethyl acrylate) was added, and reaction was continued for a further 7 hours at the same temperature. The disappearance of NCO absorption was confirmed via an infrared absorption spectrum, and the reaction was then halted. The number average molecular weight of the synthesized urethane acrylate (A2-1) was 2580.

Synthetic Example 2

Synthesis of a Urethane Acrylate (A2-2)

348 g (2 mol) of TDI (2,4-tolylenediisocyanate) was placed in a flask equipped with a stirring blade, and with constant stirring, 1000 g (1 mol, OH value=112 KOH mg/g) of a polyether polyol which is a copolymer of tetrahydrofuran and butylene oxide (10 mol %), and 1 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, and when the NCO % was then measured, the result was 3.57%. Subsequently, 232 g (2 mol) of HEA (2-hydroxyethyl acrylate) was added, and reaction was continued for a further 7 hours at the same temperature. The disappearance of NCO absorption was confirmed via an infrared absorption spectrum, and the reaction was then halted. The number average molecular weight of the synthesized urethane acrylate (A2-2) was 1580.

Synthetic Example 3

Synthesis of a Urethane Acrylate Oligomer (A2-3)

348 g (2 mol) of TDI (2,4-tolylenediisocyanate) was placed in a flask equipped with a stirring blade, and with constant stirring, 8000 g (1 mol) of polypropylene glycol (molecular weight 8000) and 2 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, and then 232 g (2 mol) of HEA (2-hydroxyethyl acrylate) was added, and reaction was continued for a further 7 hours at the same temperature. The disappearance of NCO absorption was confirmed via an infrared absorption spectrum, and the reaction was then halted. The number average molecular weight of the synthesized urethane acrylate (A2-3) was 8580.

Synthetic Example 4

Synthesis of a Urethane Acrylate (A2-4)

951 g of hydrogenated diphenylmethane diisocyanate, 5 g of dibutyl tin dilaurate, and 1.5 g of 2,6-di-t-butyl-p-cresol were placed in a flask equipped with a stirring blade, and then 3628 g of a polyether glycol with a number average molecular weight of 2000 (PPTMG 2000, from Hodogaya Chemical Inc.) was added over a 3 hour period at a temperature of 60 to 70° C. Following completion of this addition, stirring was continued for a further 1 hour at 60 to 70° C. Subsequently, with the temperature still maintained at 60 to 70° C., 420 g of HEA (2-hydroxyethyl acrylate) was added dropwise over a period of 1 hour, yielding a radical polymerizable oligomer (A2-4). The number average molecular weight of the synthesized urethane acrylate (A2-4) was 2756.

Synthetic Example 5

Synthesis of a Urethane Acrylate (A2-5)

96.52 g of IPDI (isophorone diisocyanate), 1 g of dibutyl tin dilaurate, and 0.5 g of 2,6-di-t-butyl-p-cresol were placed in a flask equipped with a stirring blade, and then 869.56 g of a diol, which is a copolymer of propylene glycol and tetrahydrofuran (number average molecular weight 4000, PPTG 4000, from Hodogaya Chemical Inc.) was added over a 2 hour period at a temperature of 60 to 70° C. Following completion of this addition, stirring was continued for a further 1 hour at 60 to 70° C. Subsequently, with the temperature still maintained at 60 to 70° C., 50.43 g of HEA (2-hydroxyethyl acrylate) was added dropwise over a period of 1 hour, yielding a radical polymerizable oligomer (A2-5). The number average molecular weight of the synthesized urethane acrylate (A2-5) was 4676.

Synthetic Example 6

Synthesis of a Urethane Acrylate (A2-6)

348 g (2 mol) of TDI (2,4-tolylenediisocyanate) was placed in a flask equipped with a stirring blade, and with constant stirring, 650 g (1 mol) of polytetramethylene glycol (molecular weight 650) and 1 g of dibutyl tin diacetate were added. The temperature was then carefully raised to 70° C., taking the generated heat into consideration, and 0.2 g of hydroquinone monomethyl ether and 1 g of 2,6-di-t-butyl- 4-methylphenol were added. Reaction was allowed to proceed at this temperature for 7 hours, and 232 g (2 mol) of HEA (2-hydroxyethyl acrylate) was then added. Reaction was allowed to proceed at this temperature for a further 7 hours, and once the disappearance of NCO absorption had been confirmed via an infrared absorption spectrum, the reaction was halted. The number average molecular weight of the synthesized urethane acrylate (A2-6) was 1230.

2. Synthesis of Radical Polymerizable Oligomers (A1)

Synthetic Example 7

Synthesis of a Urethane Acrylate (A1-1)

348 g (2 mol) of TDI (2,4-tolylenediisocyanate) was placed in a flask equipped with a stirring blade, and with constant stirring, 400 g (1 mol, number average molecular weight 400) of polypropylene glycol and 1 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, 260 g (2 mol) of 2-hydroxypropyl acrylate (HPA) was then added, and the reaction was allowed to proceed at this temperature for a further 7 hours. The disappearance of NCO absorption was confirmed via an infrared absorption spectrum, and the reaction was then halted. GPC analysis revealed that the urethane acrylate (A1-1) contained 93 mass % of an addition product of TDI, polypropylene glycol and HPA, with a number average molecular weight of 1399, as the radical polymerizable oligomer (A1), together with 7 mass % of direct addition products of TDI and HPA.

Synthetic Example 8

Synthesis of a Urethane Acrylate (A1-2)

348 g (2 mol) of TDI (2,4-tolylenediisocyanate) was placed in a flask equipped with a stirring blade, and with constant stirring, 192 g (1 mol, molecular weight 192) of tripropylene glycol and 1 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, 260 g (2 mol) of 2-hydroxypropyl acrylate (HPA) was then added, and the reaction was allowed to proceed at this temperature for a further 7 hours. The disappearance of NCO absorption was confirmed via an infrared absorption spectrum, and the reaction was then halted. GPC analysis revealed that the urethane acrylate (A1-2) contained 90 mass % of an addition product of TDI, tripropylene glycol and HPA, with a number average molecular weight of 1045, as the radical polymerizable oligomer (A1), together with 10 mass % of direct addition products of TDI and HPA.

Synthetic Example 9

Synthesis of a Urethane Acrylate Oligomer (A1-3)

348 g (2 mol) of TDI (2,4-tolylenediisocyanate) was placed in a flask equipped with a stirring blade, and with constant stirring, 118 g (1 mol, molecular weight 118) of 3-methyl-1,5-pentanediol and 1 g of dibutyl tin diacetate were added. The temperature was then carefully raised to 70° C., taking the generated heat into consideration, and 0.2 g of hydroquinone monomethyl ether and 1 g of 2,6-di-t-butyl-4-methylphenol were added. Reaction was allowed to proceed at this temperature for 7 hours, 260 g (2 mol) of 2-hydroxypropyl acrylate (HPA) was then added, and the reaction was allowed to proceed at this temperature for a further 7 hours. The disappearance of NCO absorption was confirmed via an infrared absorption spectrum, and the reaction was then halted. GPC analysis revealed that the urethane acrylate (A1-3) contained 94 mass % of an addition product of TDI, 3-methyl-1,5-pentanediol and HPA, with a number average molecular weight of 971, as the radical polymerizable oligomer (A1), together with 6 mass % of direct addition products of TDI and HPA.

Synthetic Example 10

Synthesis of a Urethane Acrylate (A1-4)

1851 g of TDI (2,4-tolylenediisocyanate), 5 g of dibutyl tin dilaurate, and 1.5 g of 2,6-di-t-butyl-p-cresol were placed in a flask equipped with a stirring blade. Subsequently, 1951 g of a bisphenol A propylene oxide addition product with a number average molecular weight of 360 was added over a 2 hour period at a temperature of 60 to 70° C. Stirring was continued for a further 1 hour, and 1234 g of HEA (2-hydroxyethyl acrylate) was then added dropwise over a period of 1 hour, yielding a radical polymerizable oligomer (A1-4). GPC analysis revealed that the urethane acrylate (A1-4) contained 90 mass % of an addition product of TDI, the bisphenol A propylene oxide addition product and HEA, with a number average molecular weight of 1315, as the radical polymerizable oligomer (A1), together with 10 mass % of direct addition products of TDI and HEA.

Synthetic Example 11

Synthesis of a Urethane Acrylate (A1-5)

1851 g of TDI (2,4-tolylenediisocyanate), 5 g of dibutyl tin dilaurate, and 1.5 g of 2,6-di-t-butyl-p-cresol were placed in a flask equipped with a stirring blade. Subsequently, 2291 g of a bisphenol A ethylene oxide addition product with a number average molecular weight of 400 was added over a 2 hour period at a temperature of 60 to 70° C. Stirring was continued for a further 1 hour, and 1234 g of HEA (2-hydroxyethyl acrylate) was then added dropwise over a period of 1 hour, yielding a radical polymerizable oligomer (A1-5). GPC analysis revealed that the urethane acrylate (A1-5) contained 90 mass % of an addition product of TDI, the bisphenol A ethylene oxide addition product and HEA, with a number average molecular weight of 1375, as the radical polymerizable oligomer (A1), together with 10 mass % of direct addition products of TDI and HEA.

3. Synthesis of Other Radical Polymerizable Oligomers (A)

Synthetic Example 12

Synthesis of a Urethane Acrylate Oligomer (A-X)

260 g (2 mol) of 2-hydroxypropyl acrylate (molecular weight 130) was placed in a flask equipped with a stirring blade, and with constant stirring, 174 g (1 mol) of TDI (2,4-tolylene diisocyanate) was added dropwise, with care taken over the generated heat, and the temperature was raised to 70° C. 1 g of dibutyl tin diacetate, 0.2 g of hydroquinone monomethyl ether and 1 g of 2,6-di-t-butyl-4-methylphenol were then added. Reaction was allowed to proceed at this temperature for 7 hours, and once the disappearance of NCO absorption had been confirmed via an infrared absorption spectrum, the reaction mixture was removed, yielding a urethane acrylate (A-X) as the radical polymerizable oligomer (A). The number average molecular weight of the synthesized urethane acrylate (A-X) was 434.

Synthetic Example 13

Synthesis of a Urethane Acrylate Oligomer (A-Y)

232 g (2 mol) of 2-hydroxyethyl acrylate (molecular weight 116) was placed in a flask equipped with a stirring blade, and with constant stirring, 174 g (1 mol) of TDI (2,4-tolylene diisocyanate) was added dropwise, with care taken over the generated heat, and the temperature was raised to 70° C. 1 g of dibutyl tin diacetate, 0.2 g of hydroquinone monomethyl ether and 1 g of 2,6-di-t-butyl-4-methylphenol were then added. Reaction was allowed to proceed at this temperature for 7 hours, and once the disappearance of NCO absorption had been confirmed via an infrared absorption spectrum, the reaction mixture was removed, yielding a urethane acrylate (A-Y) as the radical polymerizable oligomer (A). The number average molecular weight of the synthesized urethane acrylate (A-X) was 406.

(Preparation of Resin Compositions for a Coating for an Optical Fiber)

Using the compounds synthesized in the synthetic examples described above, together with the compounds listed below, uniform resin compositions for a coating for an optical fiber were prepared by heating and mixing constituents in the ratios (parts by mass) shown in Table 1 and Table 2, and then filtering the compositions through a 1 micron filter.

Radical Polymerizable Oligomers
A-O: Addition product of diglycidyl ether of bisphenol A and acrylic acid
Radical Polymerizable Monomers
M-1: isobornyl acrylate
M-2: N-vinylpyrrolidone
M-3: N-vinylcaprolactam
M-4: hydroxylpropyl acrylate
M-5: triacrylate of the ethylene oxide addition product of trimethylolpropane
M-6: nonylphenoxyethyl acrylate
M-7: polyethylene glycol diacrylate
N-1: dicyclopentenyl acrylate
N-2: tricyclodecanedimethylol diacrylate
N-3: trimethylolpropane triacrylate
Antioxidants
R-1: 3,9-bis[1,1-dimethyl-2-[β-(3-t-butyl-4-hydroxy-5-methylphenyl)propionyloxy]ethyl]-2,4,8,10-tetraoxaspiro[5,5]undecane
R-2: thiodiethylenebis[3-(3,5-di-t-butyl-4-hydroxyphenyl)propionate]
Photostabilizers
N-1: bis(2,2,6,6-tetramethyl-4-piperidyl) sebacate
Photopolymerization Initiators
I-1: bis(2,6-dimethoxybenzoyl)-2,4,4-trimethylpentylphosphine oxide
I-2: 1-hydroxycyclohexyl phenyl ketone
I-3: 2,2-dimethoxy-2-phenylacetophenone
I-4: 3,6-bis(2-methyl-2-morpholinopropionyl)-9-n-octylcarbazole
I-5: 2,4,6-trimethylbenzoyldiphenylphosphine oxide
I-6: 2-methyl-1-[4-(methylthio)phenyl]-2-morpholinopropane-1
I-7: benzophenone
S-1: polyether modified polydimethylsiloxane
(Preparation of Cured Films)

Resin compositions for a coating for an optical fiber prepared in accordance with Table 1 were each applied to a glass plate, and using a metal halide lamp, were then irradiated with 0.5 J/cm$^2$ of ultraviolet light in a nitrogen atmosphere, thereby forming a cured film with a film thickness of 150 μm.

(Evaluation of Cured Films)

Each cured film was evaluated using the test methods described below.

(Method of Measuring Young's Modulus for Cured Films)

Young's modulus (the tensile modulus) (2.5%) for each of the produced cured films was measured in accordance with JIS K 7113 using a No. 2 test piece. Measurements were conducted at a cross head speed of 1 mm/min. The measurement conditions were 23° C. and 50% RH.

(1) Preparation of Cured Films: Prepared resin compositions for a coating for an optical fiber were each applied to a glass plate, and using a metal halide lamp, were then irradiated with 0.5 J/cm$^2$ of ultraviolet light in a nitrogen atmosphere, thereby forming a cured film with a film thickness of 150 μm.

(2) Shape of Test Piece: Using a dumbbell cutter shaped in accordance with the No. 2 test piece shape of JIS K 7113, a test piece was punched out of each cured film. A 2 cm square metal piece of thickness 1.2 mm was then bonded to the top and bottom of the cured film outside the reference line using a cyanoacrylate adhesive, thereby completing the test piece.

(3) Measurement Apparatus: Universal tensile tester, Autograph AGS-100G, manufactured by Shimadzu Corporation (4) Cross Head Speed: 1 mm/min (5) Measurement Atmosphere Conditions: 23° C., 50% RH (Method of Measuring Breaking Elongation of Cured Films)

(1) Preparation of Cured Films: Prepared resin compositions for a coating for an optical fiber were each applied to a glass plate, and using a metal halide lamp, were then irradiated with 0.5 J/cm$^2$ of ultraviolet light in a nitrogen atmosphere, thereby forming a cured film with a film thickness of 150 μm.

(2) Shape of Test Piece and Method of Preparation: Using a dumbbell cutter shaped in accordance with the No. 2 test piece shape of JIS K 7113, a piece was punched out of each cured film, and a test piece was then prepared in accordance with the method described in JIS K 7113.

(3) Measurement Apparatus: Universal tensile tester, Autograph AGS-100G, manufactured by Shimadzu Corporation (4) Cross Head Speed: 1 mm/min (5) Measurement Atmosphere Conditions: 23° C., 50% RH In Table 1 and Table 2, in addition to the measured numerical value, each breaking elongation was also awarded an evaluation of x for values less than 30%, Δ for values from 30 to 40%, ○ for values from 40 to 50%, and Θ for values of 50% or greater.

(Method of Measuring Notch Resistance of Cured Products)

(1) Preparation of Cured Films: Prepared resin compositions for a coating for an optical fiber were each applied to a glass plate, and using a metal halide lamp, were then irradiated with 0.5 J/cm$^2$ of ultraviolet light in a nitrogen atmosphere, thereby forming a cured film with a film thickness of 150 μm.

(2) Test Piece and Test Method: Using a crescent shaped dumbbell cutter according to JIS K 6252-1993, a test piece was punched out of each cured film. Using this test piece, a measurement was then conducted in accordance with the method described in JIS K 6252-1993. A cut (notch) of length 1.0±0.2 mm was inserted in the center of the hollow of the crescent shaped test piece in a direction at right angles to the principal axis of the test piece. The cut was made with a sharp cutter in a direction parallel to the thickness direction of the test piece (perpendicularly to the upper and lower surfaces of the test piece).

(3) Measurement Apparatus: Universal tensile tester, Autograph AGS-100G, manufactured by Shimadzu Corporation (4) Cross Head Speed: 50 mm/min (5) Measurement Conditions: 23° C., 50% RH In Table 1 and Table 2, in addition to the measured numerical value, each notch resistance was also awarded an evaluation of x for values less than 4.3 (kgf/mm), Δ for values from 4.3 to less than 4.5 (kgf/mm), ○ for values from 4.5 to less than 4.8 (kgf/mm), and ⊖ for values of 4.8 (kgf/mm) or greater.

(Evaluation Results)

The evaluation results are shown in Table 1 and Table 2.

TABLE 1

|  |  | Example 1 | Example 2 | Example 3 | Example 4 | Example 5 | Example 6 | Example 7 |
|---|---|---|---|---|---|---|---|---|
| Radical Polymerizable Oligomer (A) | A2-1 | 12 | 20 | 30 |  |  | 6 | 12 |
|  | A2-2 |  |  |  | 45 | 40 |  |  |
|  | A2-3 | 7 |  |  |  |  | 14 |  |
|  | A2-4 |  |  |  |  |  |  |  |
|  | A2-5 |  |  |  |  |  |  |  |
|  | A2-6 |  |  |  |  |  |  |  |
|  | A-X |  |  |  |  |  | 18.8 |  |
|  | A-Y |  |  |  |  |  |  |  |
|  | A-O |  |  |  |  |  |  |  |
|  | A1-1 | 42.4 |  |  |  |  |  | 21.6 |
|  | A1-2 |  | 36 | 28 | 16 |  | 17.2 | 18.4 |
|  | A1-3 |  |  |  |  | 20 |  |  |
|  | A1-4 |  |  |  |  |  |  |  |
|  | A1-5 |  |  |  |  |  |  |  |
| Radical Polymerizable Monomer (B) | M-1 | 16.2 | 14.6 | 7 | 8 | 9 | 9.9 | 15.6 |
|  | M-2 | 10 | 10 |  |  |  | 10 | 10 |
|  | M-3 |  |  | 14 | 14 | 14 |  |  |
|  | M-4 |  |  |  |  |  |  |  |
|  | M-5 |  |  | 12 | 12 | 12 |  |  |
|  | M-6 | 8 | 15 |  |  |  | 16 | 18 |
|  | M-7 |  |  | 5 |  |  | 2 |  |
|  | N-1 |  |  |  |  |  |  |  |
|  | N-2 |  |  |  |  |  |  |  |
|  | N-3 |  |  |  |  |  |  |  |
| Photopolymerization Initiator | I-1 |  |  | 0.5 |  |  |  |  |
|  | I-2 | 1 |  | 3 |  | 3 | 1 |  |
|  | I-3 |  |  |  | 3 |  |  | 3 |
|  | I-4 |  | 0.5 |  |  |  |  |  |
|  | I-5 | 1 |  |  | 1 | 1 | 1 |  |
|  | I-6 |  |  | 0.5 |  |  |  |  |
|  | I-7 |  |  |  |  |  |  |  |
| Antioxidant | R-1 | 0.5 | 0.5 |  |  |  | 0.5 | 0.5 |
|  | R-2 |  |  |  |  |  |  |  |
| Photostabilizer | N-1 |  |  | 0.1 | 0.1 | 0.1 |  |  |
| Silicone oil | S-1 |  |  | 0.1 | 0.1 | 0.1 |  |  |
| Quantity of radical polymerizable oligomers (A1) |  | 39.4 | 32.4 | 25.2 | 14.4 | 18.8 | 16 | 36.6 |
| Total radical polymerizable oligomers (A) |  | 61.4 | 56 | 58 | 61 | 60 | 56 | 52 |
| (A1)/(A) |  | 0.64 | 0.58 | 0.43 | 0.24 | 0.31 | 0.29 | 0.70 |
| Urethane linkage concentration (mol/kg) |  | 1.94 | 2.18 | 1.86 | 1.96 | 2.13 | 1.95 | 1.98 |
| Young's modulus (MPa) |  | 620 | 820 | 660 | 710 | 870 | 1100 | 750 |
| Breaking elongation (%) |  | ⊖ 78% | ⊖ 78% | ⊖ 52% | ⊖ 58% | ⊖ 54% | ○ 47% | ⊖ 78% |
| Notch resistance (kgf/mm) |  | ⊖ 5.3 | ⊖ 8.8 | ⊖ 4.8 | ⊖ 5.9 | ⊖ 6.9 | ⊖ 5.3 | ⊖ 10.0 |

TABLE 2

|  |  | Comparative example 1 | Comparative example 2 | Comparative example 3 | Comparative example 4 | Comparative example 5 | Comparative example 6 |
|---|---|---|---|---|---|---|---|
| Radical Polymerizable Oligomer (A) | A2-1 |  |  |  |  |  | 20 |
|  | A2-2 |  |  |  |  |  |  |
|  | A2-3 |  |  | 25 | 25 |  |  |
|  | A2-4 | 34 |  |  |  |  |  |
|  | A2-5 |  | 45 |  |  |  |  |
|  | A2-6 |  |  |  |  | 12 |  |
|  | A-X |  |  |  | 37.6 |  |  |
|  | A-Y | 6 | 10 |  |  | 22.3 | 10 |
|  | A-O |  | 7 |  |  |  |  |
|  | A1-1 |  |  |  |  |  |  |
|  | A1-2 |  |  |  |  | 15 |  |
|  | A1-3 |  |  |  |  |  |  |
|  | A1-4 | 20.8 |  |  |  |  |  |
|  | A1-5 |  |  |  |  | 14.7 | 30 |

TABLE 2-continued

|  |  | Comparative example 1 | Comparative example 2 | Comparative example 3 | Comparative example 4 | Comparative example 5 | Comparative example 6 |
|---|---|---|---|---|---|---|---|
| Radical Polymerizable Monomer (B) | M-1 | 7 |  | 13 | 16.8 | 11.6 | 14.6 |
|  | M-2 | 8 | 6 | 10 | 10 | 6.3 | 10 |
|  | M-3 |  |  |  |  |  |  |
|  | M-4 |  |  |  |  |  |  |
|  | M-5 |  |  |  | 18.8 |  |  |
|  | M-6 |  |  | 10 | 10 |  |  |
|  | M-7 |  |  |  |  |  |  |
|  | N-1 |  | 16 |  |  |  |  |
|  | N-2 | 17.2 | 20 |  |  | 31.3 |  |
|  | N-3 |  |  |  |  |  | 11 |
| Photopolymerization Initiator | I-1 |  |  |  |  |  |  |
|  | I-2 |  | 3 | 1 | 1 |  |  |
|  | I-3 | 3 |  |  |  |  |  |
|  | I-4 |  |  |  |  |  |  |
|  | I-5 |  |  | 1 | 1 | 1.3 | 1 |
|  | I-6 |  |  |  |  |  |  |
|  | I-7 |  |  |  |  | 0.3 |  |
| Antioxidant | R-1 |  |  | 0.5 | 0.5 |  | 0.5 |
|  | R-2 |  |  |  |  | 0.3 |  |
| Photostabilizer | N-1 |  |  |  |  |  |  |
| Silicone oil | S-1 |  |  |  |  |  |  |
| Quantity of radicalpolymerizable oligomers (A1) |  | 18.7 | 0 | 0 | 13.5 | 13.2 | 27 |
| Total radical polymerizable oligomers (A) |  | 67.8 | 55 | 62.6 | 40 | 49 | 60 |
| (A1)/(A) |  | 0.28 | 0.00 | 0.00 | 0.34 | 0.27 | 0.45 |
| Urethane linkage concentration (mol/kg) |  | 1.64 | 0.88 | 1.88 | 1.08 | 2.08 | 2.08 |
| Young's modulus (MPa) |  | 600 | 610 | 680 | 600 | 1800 | 740 |
| Breaking elongation (%) |  | ⊖ 54% | ⊖ 60% | ○ 45% | ○ 48% | X 12% | ○ 45% |
| Notch resistance (kgf/mm) |  | X 4.0 | X 3.6 | X 3.3 | X 3.1 | ⊖ 13.0 | Δ 4.2 |

* The quantities of each compound shown in Table 1 and Table 2 refer to parts by mass.

The "quantity of radical polymerizable oligomers (A1)" refers to the combined total of the quantity of each of (A1-1) to (A 1-5) multiplied by the proportion of radical polymerizable oligomer (A1) within that composition, as recorded in each synthetic example.

* Examples of the calculation of the urethane linkage concentrations shown in Table 1 and Table 2 are shown below.

Calculation Examples for the Example 1

(1) The oligomer (A2-1) is the product of an addition reaction between 1 mol of PPG2000 (number average molecular weight 2000), 2 mols of TDI (molecular weight 174), and 2 mols of HEA (molecular weight 116), and consequently the quantity of urethane linkages produced when these materials react stoichiometrically is 4, and the molecular weight of the oligomer (A2-1) is determined using the formula shown below.

Molecular weight=2000×1+174×2+116×2=2580

Accordingly, the concentration of urethane linkages incorporated within 1 kg of the oligomer (A2-1) is calculated as follows:

Urethane linkage concentration=4÷2580×1000=1.550 mol/kg (2) The oligomer (A2-3) is the product of an addition reaction between 1 mol of PPG8000 (number average molecular weight 8000), 2 mols of TDI (molecular weight 174), and 2 mols of HEA (molecular weight 116), and consequently the concentration of urethane linkages incorporated within 1 kg of the oligomer (A2-3) is calculated in a similar manner to (1) above, as follows:

Urethane linkage concentration=4÷(8000+174×2+116×2)×1000= 0.466 mol/kg (3) The oligomer (A1-1) is the product of an addition reaction between 1 mol of PPG400 (number average molecular weight 400), 2 mols of TDI (molecular weight 174), and 2 mols of HPA (molecular weight 130), and consequently the concentration of urethane linkages incorporated within 1 kg of the oligomer (A1-1) is calculated in a similar manner to (1) above, as follows:

Urethane linkage concentration=4÷(400+174×2+130×2)×1000= 3.968 mol/kg (4) The urethane linkage concentration within the resin composition for a coating for an optical fiber of the example 1 is determined based on the urethane linkage concentrations of the oligomers determined above, together with the relative quantities of each of the oligomers.

(1.550×12+0.466×7+3.968×42.4)÷98.1=1.94 mol/kg

The total quantity of the constituents is calculated from oligomer A2-1 (12 parts)+oligomer A2-3 (7 parts)+oligomer A1-1 (42.4 parts)+monomers (16.2 parts+10 parts+8 parts)+ additives (1 part+1 part+0.5 parts)=a total of 98.1 parts.

The urethane linkage concentration values for the resin compositions for a coating for an optical fiber of the examples 2 to 7 and the comparative examples 1 to 5 were calculated in a similar manner.

(Production of Units and Evaluation of Deconstructability)
Production and Evaluation of Optical Fibers and Optical Fiber Units Optical fiber with an external diameter of 240 μm was prepared using a urethane acrylate based photocuring resin composition as a primary coating layer and coating this with a secondary coating layer formed from a resin composition for a coating for an optical fiber of the example 1. Subsequently, a colored layer formed from a urethane acrylate based photocuring resin with a thickness of approxi mately 5 μm was formed around the outer periphery of the optical fiber, forming a colored optical fiber with an external diameter of 250 μm. In addition, four of these colored optical fibers were aligned in parallel and then coated with a resin composition for a coating for an optical fiber of either the examples 2 to 7 or the comparative example 5, thereby forming integrated 4 optical fiber tapes (units), and deconstructability of these units was then evaluated. The results of these evaluations revealed that when the resin compositions of the example 2 through the example 7 were used as the coating, the coating could be removed over a considerable length without the tape layer splitting. In the case in which the resin composition of the comparative example 5 was used as the coating, the coated layer split during removal of the coating, and removal over a long length was not possible. The results are shown in Table 3. Compositions which were evaluated as having good deconstructability were recorded as ○, and compositions of poor deconstructability were recorded as x.

The primary coating material and the colored coating material used in producing the units are described below. Primary Coating Material: A resin composition comprising a urethane acrylate, formed from a polyether polyol starting material with an average molecular weight of 4000, as the primary constituent, and also incorporating a photoinitiator. Colored coating material: A resin composition comprising an epoxy acrylate with a bisphenol A main skeleton as the primary constituent, and also incorporating a photoinitiator, phthalocyanine and a pigment such as titanium oxide (content: 6% by weight) and a silicone based releasing agent.

TABLE 3

| Resin composition for unit layer | Example 2 through Example 7 | Comparative example 5 |
|---|---|---|
| Secondary coating resin composition | Example 1 | |
| Deconstructability evaluation | ○ | X |

According to a resin composition for a coating for an optical fiber of the present invention, a superior resin composition can be provided which displays excellent notch resistance when notches appear, and also offers excellent processability during deconstruction.

What is claimed is:

1. A resin composition for a coating for an optical fiber comprising a radical polymerizable oligomer (A) and a radical polymerizable monomer (B), wherein said radical polymerizable oligomer (A) comprises:

a radical polymerizable oligomer (A1) with a number average molecular weight of 600 to 1600 formed by reacting compounds (1) to (3) below:

(1) an aliphatic polyol compound (a1) with a chain structure which may contain branch chains, with a number average molecular weight of 50 to 600, (2) a polyisocyanate compound (a2) with a ring structure, and (3) a compound (a3) with a hydroxyl group and a radical polymerizable unsaturated group within a single molecule;

and a radical polymerizable oligomer (A2) formed by reacting compounds (4) to (6) below:

(4) an aliphatic polyol compound (a4) with a chain structure which may contain branch chains, with a number average molecular weight of 800 to 10,000, (5) a polyisocyanate compound (a5), and (6) a compound (a3) with a hydroxyl group and a radical polymerizable unsaturated group within a single molecule;

a mass ratio (A1)/(A2) of said radical polymerizable oligomer (A1) and said radical polymerizable oligomer (A2) is within a range from 20/80 to 80/20, and a concentration of urethane linkages within said resin composition for a coating for an optical fiber is within a range from 1.85 to 3.00 mol/kg.

2. A resin composition for a coating for an optical fiber according to claim 1, wherein said polyol compound (a1) and said polyol compound (a4) are compounds with a polyether structure.

3. A resin composition for a coating for an optical fiber according to claim 1, wherein said polyol compound (a1) and said polyol compound (a4) are ring opening addition polymers of at least one compound selected from a group consisting of propylene oxide, 1,2-butylene oxide and 3-methyltetrahydrofuran.

4. Optical fiber coated with a cured material of the resin composition for a coating for an optical fiber according to any one of claim 1, claim 2 and claim 3.

5. An optical fiber unit coated with a cured material of the resin composition for a coating for an optical fiber according to any one of claim 1, claim 2 and claim 3.

* * * * *